Oct. 10, 1939.　　　M. B. ALLEN　　　2,175,655
TRACK GAUGE
Filed March 1, 1938　　　2 Sheets-Sheet 1
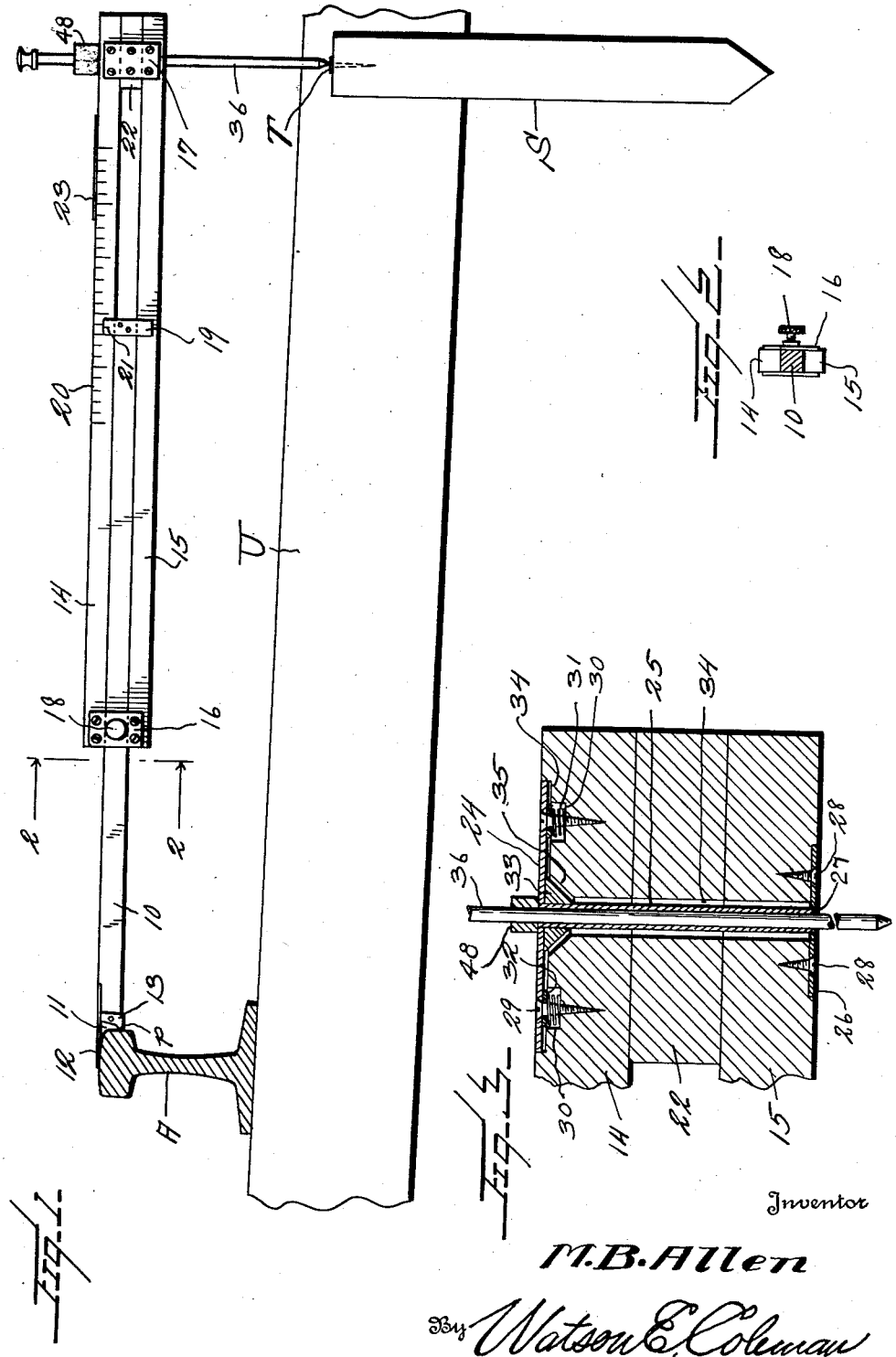
Inventor
M. B. Allen
By Watson E. Coleman
Attorney

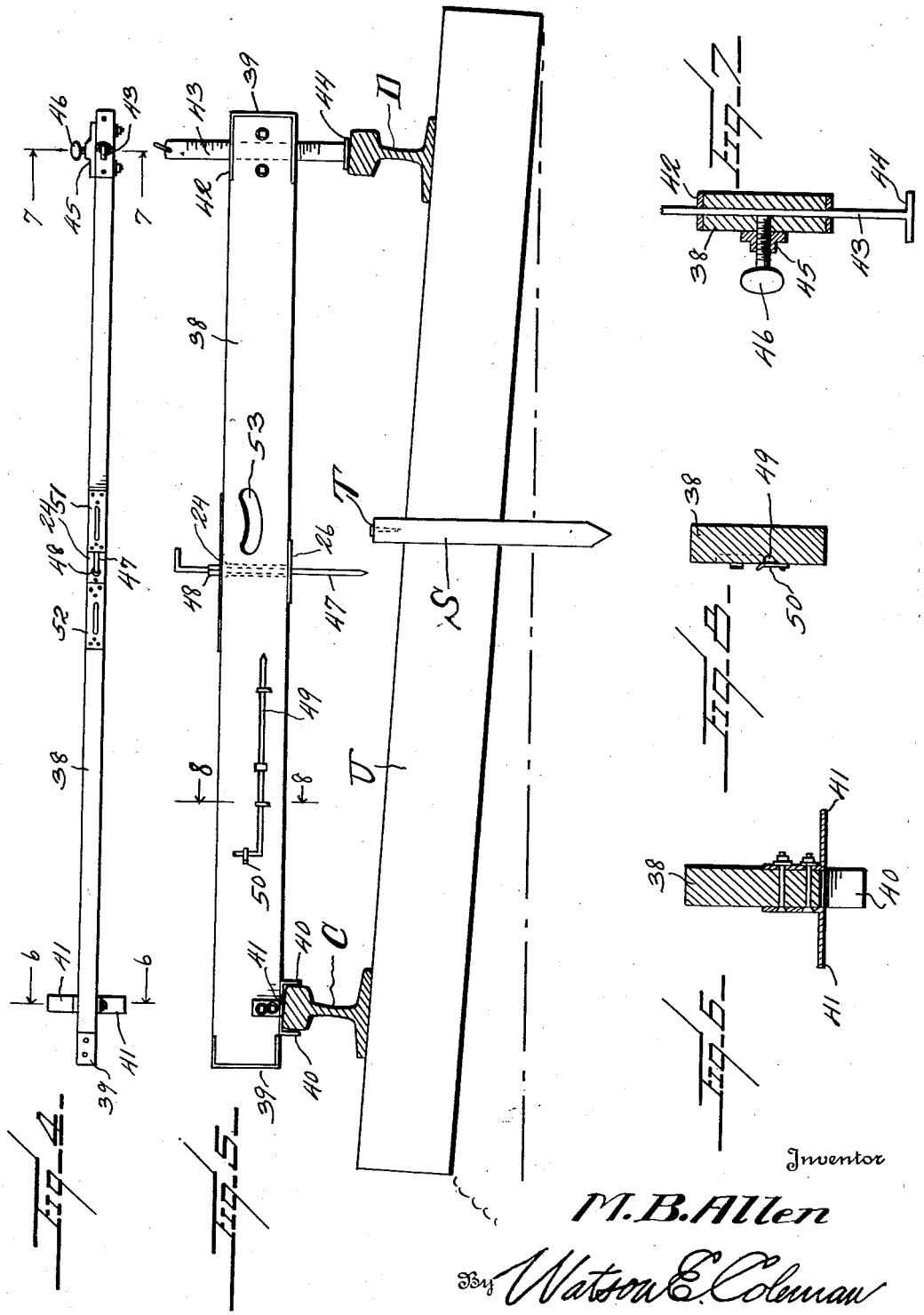

Patented Oct. 10, 1939

2,175,655

UNITED STATES PATENT OFFICE 2,175,655

TRACK GAUGE

Myron Blair Allen, Conneaut, Ohio

Application March 1, 1938, Serial No. 193,378

6 Claims. (Cl. 33—145)

This invention relates to track gauges designed for use in "string-line" tack and stake setting (where the system known as the "string-lining of curves" is in use) and to what are known as level boards.

More particularly the invention relates to a particular mounting for the vertically adjustable pointer or indicating pin in such a level board or track gauge, this mounting being such that the pin may be accurately adjusted so that it is at all times disposed exactly in a true vertical position when the level on the stock or "board" shows that the stock is truly horizontal and whereby it may be accurately adjusted vertically through the stock and held in adjusted position.

An object of the invention is to provide a string-line tack or stake setting gauge which is extensible or contractible and which has means at one end to engage against a rail of the track and at the other end is provided with a pointer or gauge pin which is vertically adjustable and which may be used to indicate accurately the position of stakes or tacks driven into the ballast of the road bed and indicating the true center line of the track.

A further object is to provide a leveling board or gauge particularly adapted for use in connection with curved portions of a track for the purpose of indicating the amount of shift in the track which may be necessary to make the curve even and conformable to specifications and without "flat" or "sharp" spots in the curve.

A still further object of the invention is to provide a pointer or gauge pin bearing of peculiar construction which is disposed entirely within the leveling board or stock instead of being disposed on the exterior of the board where it may be displaced either during use or transportation.

Still another object in this connection is to provide a pointer or gauge pin which is fully adjustable, which permits easy installation and rapid correction of any errors found during the life of the board, and in this connection to provide means for carrying the pointer on the board which will protect the pointer from any damage when the pointer or gauge pin is not in use.

Other objects will appear in the course of the following description.

My invention is illustrated in the accompanying drawings wherein:

Fig. 1 is a side elevation of my improved gauge constructed for the purpose of indicating the placing of the stake and tack between the rails.

Fig. 2 is a section on the line 2—2 of Fig. 1.

Fig. 3 is a fragmentary longitudinal section through the gauge at one end thereof showing the mounting for the gauge pin.

Fig. 4 is a top plan view of a modified form of gauge.

Fig. 5 is a side elevation of the structure shown in Fig. 4.

Fig. 6 is a section on the ine 6—6 of Fig. 4.

Fig. 7 is a section on the line 7—7 of Fig. 4.

Fig. 8 is a section on the line 8—8 of Fig. 5.

In Figs. 1 to 3, I have illustrated a string-line tack-setting gauge which may be used for setting tacks in stakes, which tacks and stakes indicate the true center-line of a track. This gauge is extensible. The gauge, as illustrated, consists of a stock section designated 10. This at one end carries an iron facing piece 11 having an upper plate 12 which extends beyond the rod 10 and is adapted to rest flat upon the outside rail A. This metallic piece 11 has ears 13 attached by screws to the rod 10. The member 11 is curved to provide contact at only one point $p$ with the ball of the rail. The other section of the gauge consists of two rods 14 and 15, the rod 14 being disposed upon the upper face of the rod 10 while the rod 15 is disposed against the underface of the rod 10. These rods 14 and 15 are connected at their opposite ends by the plates 16 and 17, there being a pair of these plates 16 and 17 at each end of the rods. The plate 16 carries upon it a locking screw 18 which bears against the portion 10 and locks this portion 10 or slide in its adjusted position with relation to the rods 14 and 15. The slide 10 carries upon it a cross-piece 19 which bears against the side faces of the rods 14 and 15 and the rod 14 is shown as being provided with graduations 20 with which an index mark 21 on the member 19 coacts. Between the plates 17, the rods 14 and 15 are connected by a block 22. Disposed upon the upper face of the rod 14 in any desired proximity to the adjacent ends of the sections or rods 14 and 15 is a spirit level or bubble glass 23 preferably adjustable so that it may be corrected from time to time.

Extending downward through the block 22 and through the adjacent ends of the sections or rods 14 and 15 is an indicating or gauge pin having the form of a plunger.

The particular mounting of this pin is as follows:

On the upper face of the section or bar 14 there is disposed a plate 24 which is set into the upper face of the rod 14 so as to be flush therewith. Attached to this plate at its middle and extending through the connected ends of the elements 14, 22 and 15 is a tubular bushing or sleeve 25. On the underface of the section 15 is disposed a plate 26 which is set into the face of the rod 15 and provided with a medially disposed opening 27. This plate 26 is held in place by screws 28. The upper plate 24 is also held in place by screws 29 but immediately beneath the openings for these screws, the bar 14 is recessed or countersunk at 30, and disposed within each countersink is a spring 31 and a washer 32, the spring urging the washer upward and, therefore, urging the plate 24 upward. There are four of these screws 29. The upper end of the bushing 25 has a conical reinforcement 33 extending between the plate 24 and the attached sleeve or bushing 25. Extending through the two bars 14 and 15 and the intermediate block 22 is a passage 34 which is greater in diameter than the exterior diameter of the bushing 25. The opposite or upper end of the passage 34 is conically enlarged at 35, and this enlargement is greater in diameter than the diameter of the reinforcement 33. By reason of the fact that the passage 34 is larger than the exterior diameter of the sleeve or bushing 25 and of the reinforcement, the bushing 25 may be shifted in a plurality of directions by loosening one or more of the screws 29 and thus this bushing may be adjusted into a position exactly at right angles to the plane of the upper face of rod 14 or, in other words, the bushing may be adjusted into exact right angles to the upper face of the gauge formed of the slide 10 and the two sections 14 and 15.

Extending through this sleeve or bushing 25 is a gauge pin 36. This fits snugly within the bushing or sleeve 25 but is adjustable vertically through this bearing sleeve or bushing. This pin or pointer while frictionally held in place can be struck with a hammer to make a tack mark in the head of a stake S, in which a tack T may be afterwards driven.

When setting stakes by "string-lining" methods to eliminate flat or sharp spots in curves, the location of the stakes is accurately measured on radii from the high rail. The distances measured depend on the results desired and may vary at each chordal point along the track. Because of these variable measurements, the gauge is extensible and is used as follows:

With the pointer disposed at a previously computed distance from the point $p$ of member 13, the gauge is placed as shown in Fig. 1, horizontally with members 12 and 13 contacting rail A. The pointer 36 will indicate the exact location for stake S. A stake is centered on the pin 36, the gauge removed and the stake driven. The gauge is again applied to rail A with the end of pointer 36 contacting the top of stake S, thus indicating the exact location for tack T. The pointer is given a sharp blow, making an indentation in the stake into which a tack or brad may be driven. This operation is repeated whenever it is necessary to place stakes for re-alining railroad curves using "string-lining" methods.

The point so indicated will be the true center point, provided that the gauge is not warped or worn, and that the point is in an absolutely vertical position when the gauge is truly horizontal. If the gauge is warped, however, this would throw the pointer or pin 36 off. Furthermore, the hole or passage for the gauge pin (as for instance, if this hole or passage were simply bored through the wood of the gauge) may not be bored exactly at right angles to the face of the gauge, or the pin or the passage through the wooden gauge stock or board may become worn. It is for this reason that I provide the bushing 25 and provide means whereby by taking off the plate 26, the bushing 25 may be adjusted by delicately adjusting screws 29, to bring the bushing into a truly vertical position when the gauge is in a true horizontal position. After this adjustment, the plate 26 is replaced with its opening exactly in register with the lower end of the adjusted bushing. It is to be understood that the adjustment need be very slight and that it is to be made, not necessarily when the gauge is in use, but from time to time, to check up on the gauge.

By adjusting one or more of these four screws 29, the bushing 25 may be adjusted properly at each corner, so that the bushing 25 will be in an exactly vertical position when the level 23 indicates a truly horizontal position for the gauge itself.

In Figs. 4 to 7, I show a leveling board or gauge designed particularly for use in indicating the extent of shift necessary to bring two lines of rails into proper relation to a line of stakes which indicates the correct location for the rails C and D. In these figures, 38 designates the leveling board proper or stock. This is not extensible. Each end of the board is reinforced by a steel band 39 held in place by screws or any other suitable means. Attached to that end of the board or stock which is to engage with the rail C is a channel-shaped steel guide 40 having downwardly extending flanges adapted to embrace the head of the rail C. Angle irons 41 are bolted or otherwise attached to the side faces of the stock at this point so that these angle irons will rest upon the tread face of the rail C. At the opposite end of the stock 38, the steel band 39 may be extended over the upper and lower faces of the stock, as at 42, to provide slotted plates through which a graduated elevating stem 43 may pass. This elevating stem passes through the stock, of course, and at its lower end is formed with a foot 44 adapted to rest upon the tread face of rail D. A bridge piece 45 is bolted to the side face of the stock and through this passes a set screw 46 which bears against the stem 43 and holds it in adjusted position. It will be obvious that the stem 43 may be adjusted up or down to any required degree, depending upon the "bank" of the roadway.

The gauge pin 47 or pointer is held in place in exactly the same manner as previously described for the pin 36 and is adjustable through a sleeve or bushing in exactly the same manner as previously described, hence it is not believed that it is necessary to re-describe this portion of the device. This pointer or gauge pin also carries upon it a friction sleeve 48. This pointer or gauge pin, when not in use, may be carried in a recess 49 formed in the side face of the stock 38 and held in place by spring clips 50 or any other suitable means. This prevents this pointer from becoming accidentally bent or deformed, as it might be if at all times it extended through the stock and projected above and below the stock as it does in actual use.

Disposed on each side of the gauge pin 47 and mounted within recesses in the upper face of the stock 38 are the two spirit levels 51, these spirit levels being adjustable by means of screws 52 in a well-known manner so that when the leveling board or stock is disposed on an absolutely horizontal surface, the bubbles in these spirit levels will take identical positions and take positions indicating this horizontality. It is preferred to provide two spirit levels 52 mounted in the stock so that one can be checked by the other, thus it can be seen when one or the other spirit levels is out of proper adjustment and adjustments can be made. The stock is also preferably provided with a handle opening 53.

The gauge pin or pointer 47 is disposed vertically through the stock 38 in such a manner as to place the center line of pin 47 exactly 28¼" (measured horizontally) from the inside face of the steel guide 40, which inside face contacts the inside face of rail C as shown in Fig. 5. In the use of this device, the leveling board or stock is disposed upon the rails, in the manner indicated in Fig. 5, opposite a previously driven stake S, with the level bubbles indicating horizontality. In this position the pointer 47 will be disposed truly vertically 28¼" from inside face of the ball of the rail C and the pointer has been adjusted vertically in bushing 25 until the bottom of the pointer is slightly above the tack T in stake S. Under the conditions shown in Fig. 5, the pointer 47 is disposed in offset relation to the stake S and the tack T thereon and this shows clearly and immediately that the track must be shifted to the right in Fig. 5, until the pointer 47 is disposed exactly above the tack T, if correct alinement is obtained. When this shifting has been done, the rail C will be correctly spaced from the tack T, and rail D being maintained or spaced from rail C will be in its correct location.

It will be seen that here again, it is absolutely necessary that the pointer or gauge pin 48 be disposed absolutely in a vertical position when the stock 38 is in a truly horizontal position. Now if the stock is warped or worn, as before described, or if the foot 44 be somewhat thicker than the thickness of the element 40 or the angle irons 41 be disposed slightly lower than they should be, the gauge pin 47 will not be disposed in a truly vertical position when the bubbles in the levels 51 and 52 show that the stock is in a truly horizontal position. It then becomes necessary to adjust the pin or pointer 47 in the same manner as previously described for Figs. 1, 2 and 3, it being understood that the pointer or gauge pin 47 is mounted within the stock 38 in precisely the same manner as that shown in Fig. 3. This adjustment should be made, of course, initially when the stock is made, but I design that my gauge pin mounting shall be applied to boards or gauge stocks as already in use on railroads. These stocks are usually made in the company's shop and these shops are not equipped with absolutely accurate tools for boring passages through these wooden blocks exactly at right angles thereto, hence the necessity of providing means for adjusting the gauge pin into a position exactly at right angles to the stock. Furthermore, these stocks are usually made of pine and are liable to warp, get out of shape and become worn, and furthermore, the passage through the stock may become enlarged, hence the necessity of providing the bushing 25 through which the pin or pointer 36 passes, as shown in Fig. 3, and providing means, as previously described, whereby the bushing may be initially and from time to time adjusted, so as to bring the pointer into an absolutely vertical position when the stock is in a truly horizontal position as indicated by the levels 51 and 52.

The stock or board may be readily applied to the track opposite any line stake in a manner similar to that shown in Fig. 5, and with the pin or pointer truly vertical, as indicated by the central position of the bubbles in level 51, the amount of shift necessary to correct the location of the rails is clearly and rapidly indicated. The board remains in the position as shown in Fig. 5 on the rails until the shifting necessary to dispose the pointer 47 exactly above the tack T has been completed. When shifting at one stake has been completed, the board is moved to the next stake and the above described procedure is repeated. Care must be taken during the track shifting to make sure that the bubbles in the level glasses indicate horizontality during the operation. This device may be used to aline track properly to stakes set by any method.

It will be seen from the above that the structure shown in Figs. 4 and 5 is particularly designed as a means of correcting horizontal alinement of track to previously driven stakes.

It is to be understood that the pointer 36 or 47 may be applied to any type of conventional level board now in use and that it is not restricted to any particular type of level board or stock.

The construction which I have illustrated in Figs. 4 to 7 does away with the necessity of measuring from the inside face of the high rail as is usually done, and then applying a pencil disposed in a vertical position at a point halfway between the tracks or applying a plumb bob to the measuring rule at this point and then calculating how much the rails must be shifted. The stock may be readily applied to the tracks each time that the rail C is shifted until, with the stock in an absolutely horizontal position and the pin in an absolutely vertical position, the pin 47 comes immediately above the tack T. This may be readily done at every joint between the rails or at stations or chordal points along the track in accordance with the "string-line system" of forming track curves.

While I have illustrated certain details of construction and certain definite arrangement of parts, I wish it understood that various minor modifications might be made therein without departing from the spirit of the invention as defined in the appended claims.

What is claimed is:

1. A track gauge, including a stock having a vertically extending passage therethrough, a plate disposed on one face of the stock and having a bushing rigidly attached to the plate and extending through the passage, the bushing being of less exterior diameter than the internal diameter of the passage, means adjacent the four corners of the plate whereby the plate may be canted into any one of a plurality of angles with reference to the face of the stock to thereby adjust the bushing into required angular relation to the face of the stock, a second plate on the opposite side of the stock having an opening to receive the end of the bushing, and a gauge pin having frictional engagement within the bushing and vertically adjustable therethrough.

2. A track gauge, including a stock having a vertically extending passage therethrough, a plate disposed on one face of the stock and having a bushing rigidly attached to the plate and extending through the passage, the bushing being of less exterior diameter than the internal diameter of the passage, means adjacent the four corners of the plate whereby the plate may be canted into any one of a plurality of angles with reference to the face of the stock to thereby adjust the bushing into required angular relation to the face of the stock, a second plate on the opposite side of the stock having an opening to receive the lower end of the bushing, and a gauge pin having frictional engagement within the first-named bushing and vertically adjustable therethrough, the gauge pin having thereon a stop limiting the movement of the pin.

3. A track gauge, including a stock having a vertically extending passage therethrough, a gauge pin extending through the passage of the stock but having a diameter substantially less than the internal diameter of the passage, and means for adjusting the gauge pin within the passage and into angular relation to the passage to cause the gauge pin to be absolutely vertical when the stock is truly horizontal.

4. A track gauge, including a stock having a vertically extending passage therethrough, a plate disposed on one face of the stock and having a bushing rigid therewith and extending entirely through the passage, the bushing being of less exterior diameter than the internal diameter of the passage, there being reinforcement at the point of connection of the bushing with the plate, screws passing through the four corners of the plate and into the stock, springs surrounding said screws and urging the plate upward when the screws are loosened to thus adjust the plate into a position where the bushing is exactly vertical when the stock is exactly horizontal, a second plate on the opposite side of the stock, a gauge pin extending through and having frictional engagement with the bushing and vertically adjustable therein, and frictional means disposed on the gauge pin and bearing against the first-mentioned plate resisting downward movement of the gauge pin.

5. A track gauge of the character described, comprising a body consisting of two spaced parallel bars, a block member secured between said bars at one end of the body, the said block and adjacent bars having a bore therethrough, means coupling the bars together at the opposite end of the body, a single slide bar interposed between the body bars, said slide bar having a pointer member secured thereto between the block body and the means securing the body bars together at the said other end thereof, an index upon one of said body bars cooperating with said pointer, means at the other end of the slide bar facilitating the attachment of the end to the head of a track rail, a gauge pin extending through said bore, and means connecting the gauge pin with the adjacent body whereby the gauge pin may be adjusted in the bore to bring the same into perpendicular relation with the bars of the body and whereby the gauge pin may be additionally adjusted longitudinally through the bore.

6. A track gauge of the character described, comprising a pair of spaced parallel bars forming a body, means securing the bars together in spaced relation at the two ends of the body, a slide bar interposed between the body bars, pointer and index means associated with the slide bar and body whereby the slide bar may be moved into a predetermined position of adjustment with respect to the body, means at the end of the slide bar which is extensible from the body facilitating the connection of said slide bar end with the head of a track rail, the said body at the end remote from the track rail engaging end of the slide bar having a bore transversely therethrough, a pin member extending longitudinally through said bore, means coupling the pin member with the body whereby the adjustment of the pin with respect to the body may be made to bring the pin and body into perpendicular relation, the said pin being longitudinally adjustable through the bore, and means for retaining the pin in longitudinally adjusted position in the bore, said last means comprising a body surrounding and frictionally engaging the pin and having contact with an adjacent portion of the body.

MYRON BLAIR ALLEN.